June 25, 1963  J. W. CROWNOVER  3,095,476
VARIABLE CAPACITANCE TRANSDUCER WITH A RADIOACTIVE BATTERY
Filed Jan. 8, 1954  2 Sheets-Sheet 1
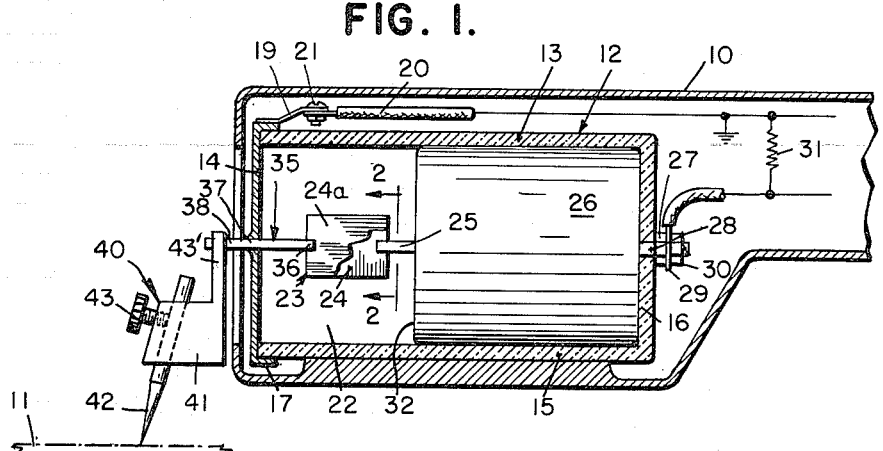
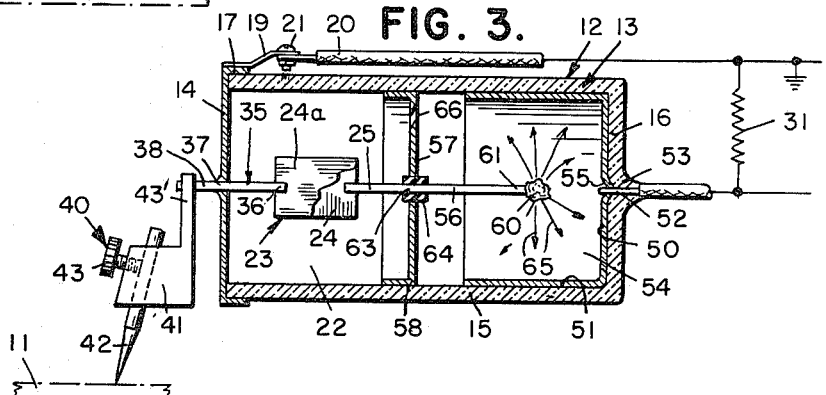
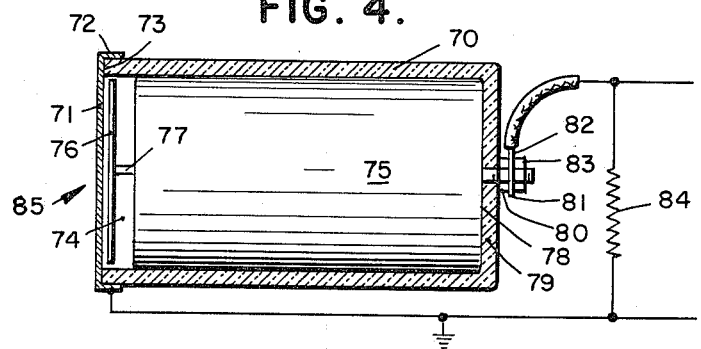
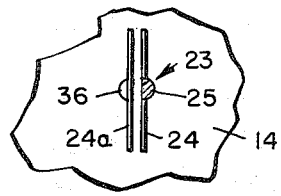
INVENTOR
JOSEPH W. CROWNOVER
BY
Mason & Graham
ATTORNEYS June 25, 1963 J. W. CROWNOVER 3,095,476
VARIABLE CAPACITANCE TRANSDUCER WITH A RADIOACTIVE BATTERY
Filed Jan. 8, 1954 2 Sheets-Sheet 2

INVENTOR
JOSEPH W. CROWNOVER
BY
*Mason & Graham*
ATTORNEYS

United States Patent Office 3,095,476
Patented June 25, 1963

3,095,476
VARIABLE CAPACITANCE TRANSDUCER WITH A RADIOACTIVE BATTERY
Joseph W. Crownover, Sherman Oaks, Calif., assignor, by mesne assignments, to Gulton Industries, Inc., a corporation of New Jersey
Filed Jan. 8, 1954, Ser. No. 402,960
3 Claims. (Cl. 179—1)

This invention relates generally to mechanoelectric transducers, and more particularly to a type of transducer device which utilizes a variable capacitance circuit to produce output voltages corresponding to mechanical or acoustical input vibrations.

It is an object of the invention to provide a novel, compact, self-powered mechanoelectric transducing device which may be operatively combined with a phonograph pickup device to be mechanically actuated by a vibration pickup element engaging a phonograph record, and to produce characteristic output voltages.

It is another object to provide a novel, compact, self-powered mechanoelectric transducing device which may be operatively combined with a microphone unit to be acoustically actuated by sound waves, and to produce characteristic output voltages.

It is another object to provide a novel, self-powered transducing device utilizing a variable capacitance circuit, there being a radioactive D.C. high-voltage source provided for imparting an electrical charge to a fixed capacitive element associated with the voltage source and to a variable external capacitance in order that the voltage output produced on varying the capacitance of the circuit may be equivalent to or greater than the voltages produced in the output stage of a conventional voltage amplifier circuit.

It is another object to provide a novel D.C. circuit for use in integral operative combination with a phonograph pickup unit or microphone unit characterized by an approximate voltage balance, there being means provided for altering the voltage balance of the circuit in accordance with movements of a vibration sensitive element to produce voltage output fluctuations which correspond in frequency and amplitude to those of the source of mechanical or acoustical vibrations.

It is a further object to provide a novel, mechanoelectric transducer unit employing a radioactive D.C. charging means and a circuit adapted to store electrical energy, there being means provided for altering the energy storage capacity of the circuit in response to the movement of an actuating member to obtain a voltage output which varies in amplitude and frequency with the movements of the actuating member.

Figure 5:
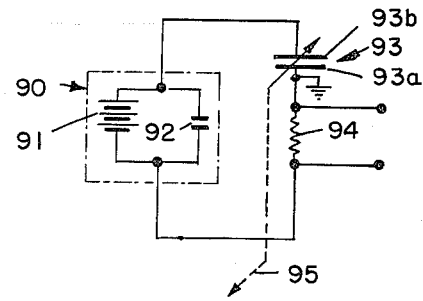
Figure 6:
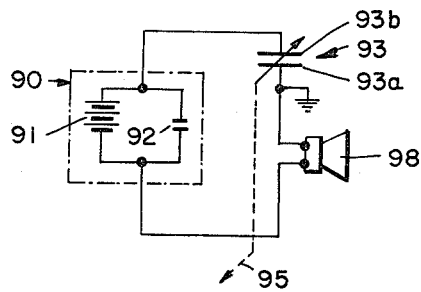
Figure 7:
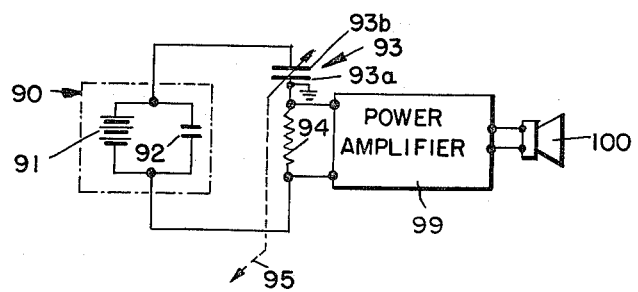

These and other objects and advantages will become apparent from a consideration of the following description and the appended claims in conjunction with the accompanying drawings wherein:
26 HICKS — 43141 — June 6th (Day Patents) 26
FIGURE 1 is a sectional view of a portion of a phonograph pickup arm with a pickup-transducing device embodying the present invention shown therein;
FIGURE 2 is a sectional view of the variable capacitor illustrated in FIGURE 1 and taken on line 2—2 thereof;
FIGURE 3 is a view in section of another form of pickup device;
FIGURE 4 is a view in section of a microphone unit embodying the present invention;
FIGURE 5 is a diagrammatic illustration of an electrical circuit including the components of the present invention;
FIGURE 6 is a diagrammatic illustration of the electrical circuit of the present invention operatively combined with a speaker power circuit; and
FIGURE 7 is another diagrammatic illustration of the circuit combined with another speaker circuit.

Referring now to FIGURE 1, there is illustrated in section therein a phonograph pickup head or housing 10 which is shown positioned above a phonograph record, a part 11 of which is illustrated.

The head 10 encloses a pickup device 12 which includes a container 13 having a flexible metallic end wall 14, an elongated cylindrical body 15, and an end wall 16. The container body 15 and end wall 16 are preferably of dielectric or insulating material such as glass or porcelain; however, the end wall 14 is a conductor and has a lip or flange 17 in sealing engagement with the outer surface of the end of the cylindrical body 15. The flange 17 is fastened to a terminal 19, and a wire lead 20 is joined to the terminal by means of a screw member 21.

The container encloses a partially evacuated chamber 22 within which there is positioned a variable capacitor or condenser 23. The latter includes a pair of laterally spaced plates 24 and 24a disposed closely adjacent one another, the plates being positioned vertically or in parallel relation to the substantially vertical plane of swinging or articulation of the pickup head 10. Plate 24 is rigidly affixed to a terminal 25 protruding from a radioactive type battery, or D.C. voltage source 26, which is firmly or rigidly positioned within the chamber 22 and against the end wall 16 of the container by means of a nut 27 engaging the threaded end of a second terminal 28 of the battery. The second terminal 28 protrudes through end wall 16 of the container and is sealed thereto so as to form an air-tight seal therewith. A second wire lead 29 is fastened to the terminal 28 as by means of the nut 30, and a load resistor 31 is electrically connected between the two leads 20 and 29. It is pointed out that the plate 24 is positioned very close to the battery 26 in order to minimize the resistance and capacitance of the electrical connection between the plate and battery, since the capacitance of the connection adversely affects the sensitive capacitive characteristic of the two plates 24 and 24a, and the resistance of the connection causes power losses as current flows therethrough. Also the size of the connection should be very small to minimize leakage of charge therefrom into the rarefied gas or air in chamber 22. The battery itself is of the radioactive type and therefore has a radiation absorbing end wall 32 which absorbs emitted particles and prevents their coming into contact with either of the plates 24 or 24a to adversely affect the capacitance thereof.

Plate 24a is rigidly connected to a pivotally mounted actuating member such as the link member 35. The latter protrudes through the flexible metallic wall member 14, and is rigidly fastened thereto as by soldering or brazing to form an air-tight seal and a support for the link member. The link includes an end portion 36 to which the plate 24a is fastened, an intermediate portion 37 which is supported by the metallic wall member 14, and a portion 38 protruding outwardly from the wall 14. To the latter portion there is operatively connected a mechanical motion pickup device such as the phonograph needle support 40. The support includes an apertured body 41 adapted to receive a phonograph needle 42, a set screw 43 adapted to retain the needle therein, and a vertical arm 43' which projects upwardly from the body portion 41 and is rigidly joined to the protruding portion 38 of the link at a point spaced from the intermediate supported portion 37 thereof.

The novel support structure for the link 35 is of unusual construction and is highly useful and advantageous in that it bears the weight of the entire outboard end of the phonograph pickup arm, including the head 10 and associated mechanism, and yet allows the link to deflect horizontally with maximum freedom in response to vibrations of the needle 42. In other words, the weight of the head 10 and associated mechanism is taken by the needle support mechanism 40, which tends to pivot the link 35 and the flexible wall 14 in a clockwise direction about the approximate center of rotation at the intermediate portion 37 of the link. This rotation or pivoting is, of course, limited by the resistance to bending in that particular mode offered by the flexible plate 14, and is practically limited to only a few degrees. It will be noted that the value of the capacitance determined by the spacing of the plates 24 and 24a is not materially affected by such pivoting of the link 35 since the plate 24 will merely be displaced relative to plate 24a by only a very small amount; furthermore, because the plates are both mounted vertically, the relative displacement therebetween will be parallel, thereby minimizing capacitive change.

On the other hand, the flexibility of the plate 14 allows a similar degree of horizontal movement of the link member 35, in response to vibrations of the needle 42, which movement is reflected in a corresponding movement of plate 24a toward and away from plate 24, thereby varying the capacitance between the plates to a marked degree, depending of course on the initial spacing of the plates. Thus vertical positioning of the plates 24 and 24a effects a maximum variation in capacitance therebetween for a given horizontal movement of the needle, and a minimum variation in capacitance for a given vertical pivoting of the link 35.

The pickup device illustrated in FIGURE 3 is similar to that shown in FIGURE 1, with the exception that the radioactive voltage source is integrally combined with the container so as to decrease the weight of the phonograph pickup arm, and so as to provide an integral transducer unit. The elements enumerated in FIGURE 1 are again enumerated similarly in FIGURE 3, with the exception of the radioactive battery portion of the pickup device. The latter includes a radiation collecting electrode 50 spaced adjacent a portion of the inner surface of the container 13, as by coating the cylindrical right end portion 51 of the inner surface of the container with a metallic compound to form a conducting surface, or collective electrode 50. A wire lead 52 is embedded in the glass nipple 53 at the end of the container during manufacture, and protrudes inwardly into the chamber 54 surrounded by the electrode 50 and contacts the dimpled portion 55 of the electrode 50. An elongated electrically conductive member 56 extending axially within the container is rigidly supported by a radioactive particle shield or baffle 57 extending transversely across the chamber 22. The shield has a ring-shaped portion 58 which is bonded to the inner surface of the cylindrical container 13 between the electrode 50 and the plates 24 and 24a of the capacitor 23. The purpose of the shield is to protect the capacitor plates from particles emitted by the radioactive substance 60 carried by member 56, which particles might otherwise cause ionization of the rarefied atmosphere or gas between the plates 24 and 24a, thereby weakening the dielectric strength of the air or gas between the plates and leading to electrical discharge between the plates.

The radioactive substance 60 may comprise an appropriate isotope such as strontium 90 having a half life measured in years, to give extended utility to the battery. The emitting substance 60 is carried by the right end portion 61 of the elongated member 56 at a point in space near the geometric center of the envelope formed by the electrode 50. The left end portion 25 of member 56 rigidly supports the plate 24a, as described in FIGURE 1, and an intermediate portion 63 of member 56 is rigidly supported by the shield 57 and separated therefrom by an insulator 64, of cylindrical shape. The trajectories of the emitted particles, comprising beta electrons, are indicated by arrows 65. The shield 57 contains an aperture 66 permitting the container 13 to be evacuated through the nipple 53 during manufacture thereof. Aperture 66 is located near the periphery of the shield and is drilled at an angle to the axis of the container 13 in order to preclude emitted particles from entering chamber 22.

In FIGURE 4 there is illustrated a microphone unit embodying the principles of the present invention. The elongated cylindrical container 70 comprises a dielectric or insulating body such as glass or porcelain and has one end thereof sealed by means of a flexible metallic end wall or plate 71, which has a ring-shaped portion 72 in air-tight sealing engagement with the outer surface of a portion of the end wall 73 of the container. The container encloses a partially evacuated chamber 74 in which there is rigidly positioned a radioactive type D.C. voltage source 75. A thin metallic plate member 76 is positioned in chamber 74 in close proximity to end plate 71 and in transverse position with respect to the axis of the container 70. Plate 76 is rigidly supported at the end of a terminal 77 projecting leftwardly from the radioactive battery 75. The right end wall portion 78 of the battery is held snugly against the end wall 79 of the container by means of a nut 80 engaging the threaded end of a second terminal 81 of the battery. The latter terminal protrudes through end wall 79 of the container and is joined thereto so as to form an air-tight seal therewith.

A wire lead 82 is fastened to the terminal 81 as by means of the nut 83, and a load resistor 84 is effectively electrically connected between the end wall or plate 71 and the lead 82. It is to be noted that the two plates 71 and 76 form the plates of a variable capacitance device or capacitor 85 which is electrically connected to the radioactive battery 75 and to the resistor in the same way as are corresponding elements in FIGURE 1. The capicitance of capacitor 85 is varied by the movement of flexible plate 71 under the impact of acoustical waves striking the outer surface thereof and deflecting it toward or away from plate 76. It is also pointed out that the plate 76 is positioned very close to the battery 75 in order to minimize the resistance and capacitance of the electrical connection or terminal 77 between the plate and the battery, for reasons substantially the same as those stated in connection with FIGURE 1.

The electrical components illustrated in FIGURES 1, 2, 3, and 4 are shown schematically as circuit elements in FIGURE 5. The circuit includes a radioactive battery 90 enclosed by the broken lines and comprising a battery portion 91 having an internal capacitance represented by the capacitor 92 connected in parallel therewith. The impedance of the battery portion 91 may be considered as infinite for practical purposes. The radioactive battery 90 is connected in series with a variable capacitor 93 and a load resistor 94, the capacitor having a plate 93a subject to movement with respect to the fixed plate 93b thereof by means of actuating mechanism or acoustic vibrations shown schematically by arrow 95.

In operation, the plates of the variable capacitor 93 and the fixed equivalent capacitor 92 are initially charged to the potential of the radioactive battery. As the relative spacing between the plates of capacitor 93 is increased, the capacitance or charge storing ability of the capacitor 93 is varied to bring about a flow of current from plate 93a through the resistor 94 and to ground as the same quantity of charge flows from the fixed capacitor 92 to the plate 93b of variable capacitor 93. A potential drop or signal voltage occurs across the resistor 94 as a result of the flow of current or interchange of charge between the two capacitors, and the amplitude of the potential drop across the resistor is proportional to the increase or decrease in spacing between the plates of the variable capacitor, within certain frequency limits. Furthermore, the frequency of the changing signal voltage across the resistor corresponds to the frequency of variation of the capacitance of the variable capacitor 93. However, as the frequency increases, the plates of the capacitor will have less time to completely charge or discharge, and when the frequency increases beyond a certain level called the relaxation frequency, the discharging or charging time required by the plates will be less than the time interval during which the plates are moved toward or apart from one another. The result is that for a given change in capacitance, the voltage drop across the resistor will materially decrease at frequencies above the relaxation frequency for the circuit. Therefore, the value of resistance 94 is chosen so that the effective relaxation frequency of the circuit is equal to or greater than approximately 10,000 cycles per second, which is the approximate maximum frequency of vibrations recorded on most phonograph recordings and corresponds to the upper frequency level of sound discernible by the human ear. It is of course understood that these high frequencies should be reproduced acoustically for high fidelity sound reproduction.

It is important to realize that the actual work done in inducing flow of charge from the variable capacitor 93 to the fixed value equivalent capacitor 92 and vice versa is supplied by the external pickup in the case of the phonograph pickup device, and by the acoustic waves striking the flexible plate 71 in the case of the microphone. The work done equals the energy expended in moving the movable plate 93a of the capacitor 93 toward or away from the fixed plate 93b thereof. The energy expended by battery 90 is utilized only to accomplish initial charging of the capacitors 92 and 93, and it is important that there be no leakage of charge from the plate 93b of the capacitor or from the terminal 25 shown in FIGURE 1.

During the transducing operation the battery is not used to supply the energy output developed across the load resistor 94, but is used only to initially charge the directly connected plates of capacitors 92 and 93. The sum of these charges on the directly connected plates of the two capacitors remains very nearly constant and is not depleted during operation of the mechanoelectric transducer device. The induced flow of current back and forth between the capacitors 92 and 93 through load resistor 94 may be likened to the induced flow of current in a wire which is passed through the field of a permanent magnet, since in both cases the actual energy expended in inducing the current flow is derived from the mechanical force required to move the electrical element through the field.

To achieve maximum power output across the resistor, the capacitor 93 is chosen so as to achieve an approximate capacitive balance between the variable capacitor 93 and the equivalent capacitor 92. It is noted that the use of the radiocative battery having a high voltage and low current characteristic enables the development of relatively large voltage drops across the resistor as a result of very small movements of the movable plate 93b of the capacitor 93, a feature of considerable importance in a transducer from the standpoint of voltage sensitivity to small mechanical vibrations. It is of course understood that the magnitude of the potential drop across the resistor 94 will increase the faster the change of capacitance is accomplished. With a radioactive battery having a voltage output of 5,000 volts D.C., the capacitors 92 and 93 are initially charged to 5,000 volts, and when the capacitance of capacitor 93 is decreased from a mean value of 4 μμfd. to 3.5 μμfd. by a theoretically instantaneous movement of the movable plate 93a away from fixed plate 93b, the voltage across the variable capacitor increases theoretically to approximately 5700 volts giving a net voltage increase of 700 volts. While this voltage increase could not be realized in practice, still it will be realized that the numerical values of the resistance and capacitive elements may be chosen to realize a maximum voltage gain.

The circuit shown in FIGURE 4 may be integrally and operatively combined with a speaker unit as shown in FIGURE 6 and 7 of the drawings. In FIGURE 6 the speaker unit 98 is directly connected in series with the variable capacitor 93. A speaker unit is chosen with inductance and resistance values that will result in a maximum voltage and power input to the speaker. Thus there is provided an extremely simple and novel mechanoelectric transducing means operatively combined with a loudspeaker to drive the latter and produce acoustic vibraions which correspond in amplitude and frequency to the mechanical or acoustical vibrations constituting the capacitance-varying input to variable capacitor 93.

The arrangement illustrated in FIGURE 7 includes the resistor 94, with the voltage drop across it being applied to a power amplifier 99 driving a loudspeaker 100. The voltage output across resistor 94 as explained above is sufficiently great to be fed directly to the power amplifier, and thus the circuit constitutes a much more direct means for obtaining voltage amplification than has been known up to the present time.

It is understood that the scope of the invention is not intended to be limited by the particular embodiments selected for illustration, but is defined by the following claims.

I claim:

1. In a transducer, in combination: a circuit including a high voltage D.C. source comprising a radioactive battery having internal capacitance said battery comprising a cylindrical member and a radio active emitter centrally positioned within it; a variable capacitor in said circuit and means for physically adjusting the capacitor to vary the capacitance thereof; a container made of dielectric material having therein said radio-active battery and said variable capacitor, said capacitor being in close proximity to said radio-active battery and the radio-active battery having an electrode connecting with a fixed plate of the capacitor; and electrical resistance means in series with the capacitor and the high voltage source whereby upon physical adjustment of the capacitor to vary its charge storing capacity there is a transfer of energy between the capacitor and the capacitance of the high voltage source resulting in a substantial voltage drop across the electrical resistance means.

2. The structure of claim 1 wherein the electrical resistance means is a part of a loudspeaker.

3. The structure of claim 1 including a power amplifier and loudspeaker connected directly across the electrical resistance means.

References Cited in the file of this patent

UNITED STATES PATENTS

| | | |
|---|---|---|
| 1,333,744 | Wente | Mar. 16, 1920 |
| 1,456,538 | Crandall | May 29, 1923 |
| 1,777,397 | Crozier | Oct. 7, 1930 |
| 1,909,995 | Yeider | May 23, 1933 |
| 1,952,630 | Palmgren | Mar. 27, 1934 |
| 2,024,705 | Rutherford | Dec. 17, 1935 |
| 2,579,162 | Veneklasen | Dec. 18, 1951 |
| 2,598,925 | Linder | June 3, 1952 |
| 2,651,730 | Linder | Sept. 8, 1953 |